US008682153B2

(12) United States Patent
Chien

(10) Patent No.: US 8,682,153 B2
(45) Date of Patent: Mar. 25, 2014

(54) IMAGE CAPTURING SYSTEM AND LENS MODULE THEREOF

(75) Inventor: Chih-Ta Chien, Taipei (TW)

(73) Assignee: Ability Enterprise Co., Ltd., Taipei (TW)

(*) Notice: Subject to any disclaimer, the term of this patent is extended or adjusted under 35 U.S.C. 154(b) by 110 days.

(21) Appl. No.: 13/433,987

(22) Filed: Mar. 29, 2012

(65) Prior Publication Data
US 2013/0022341 A1 Jan. 24, 2013

(30) Foreign Application Priority Data

Jul. 20, 2011 (TW) .............................. 10125616 A

(51) Int. Cl.
G03B 17/00 (2006.01)
H04N 5/225 (2006.01)
G02B 7/02 (2006.01)

(52) U.S. Cl.
USPC .............................. 396/73; 348/360; 359/813

(58) Field of Classification Search
USPC ...................... 396/73; 348/360, 361; 359/813
See application file for complete search history.

(56) References Cited

U.S. PATENT DOCUMENTS

2006/0078322 A1* 4/2006 Nomura .......................... 396/73

* cited by examiner

Primary Examiner — Rochelle-Ann J Blackman
(74) Attorney, Agent, or Firm — Rabin & Berdo, P.C.

(57) ABSTRACT

An image capturing system and a lens module thereof are provided. The lens module includes a first barrel, a second barrel, a lens, a swing lever and a connecting shift. The first barrel has a bump. The second barrel is disposed inside the first barrel. The swing lever has a first end and a second end. The lens is disposed at the first end. The connecting shift connects the swing lever and the second barrel. The swing lever is rotated around the connecting shift. The bump is used for pushing the second end of the swing lever.

20 Claims, 6 Drawing Sheets

IMAGE CAPTURING SYSTEM AND LENS MODULE THEREOF

This application claims the benefit of Taiwan application Serial No. 100125616, filed Jul. 20, 2011, the subject matter of which is incorporated herein by reference.

BACKGROUND OF THE INVENTION

1. Field of the Invention

The invention relates in general to an image capturing system and a lens module thereof, and more particularly to a telescopic image capturing system and a lens module thereof.

2. Description of the Related Art

Along with the advance in image capturing technology, image capturing systems such as camera or video recorder have been widely used in various electronic devices. According to the characteristics of the lens, the image capturing system is divided into prime type and zoom type. The zoom lens adopts multiple lenses, and the optical path and the focusing are adjusted through relative movement of the lenses, such that the zoom lens can be adjusted as a wide-angle lens or a telescope lens.

However, as the magnification of the zoom lens is increased, the thickness of the received zoom lens also increases. The research personnel are dedicated to increasing the zoom range of the zoom lens and at the same time decreasing the thickness of the received lens module.

SUMMARY OF THE INVENTION

The invention is directed to an image capturing system and a lens module thereof. The cooperation of the bump and the swing lever makes the lens able to swing to the edge of the lens module. Accordingly, the total thickness of the lens module can be reduced.

According to one embodiment the present invention, a lens module is provided. The lens module includes a first barrel, a second barrel, a lens, a swing lever and a connecting shift. The first barrel has a bump. The second barrel is disposed inside the first barrel. The swing lever has a first end and a second end. The lens is disposed at the first end. The connecting shift connects the swing lever and the second barrel. The swing lever is rotated around the connecting shift. The bump is used for pushing the second end of the swing lever.

According to another embodiment the present invention, an electronic device is provided. The electronic device comprises a lens modular. The lens module includes a first barrel, a second barrel, a lens, a swing lever and a connecting shift. The first barrel has a bump. The second barrel is disposed inside the first barrel. The swing lever has a first end and a second end. The lens is disposed at the first end. The connecting shift connects the swing lever and the second barrel. The swing lever is rotated around the connecting shift. The bump is used for pushing the second end of the swing lever.

According to another embodiment the present invention, an image capturing system is provided. The image capturing system comprises a lens module and an image capturing device. The lens module comprises a first circuit wall, a second circuit wall, a swing lever, a lens and a connecting shift. The first barrel has a bump. The second barrel is disposed inside the first barrel. The swing lever has a first end and a second end. The lens is disposed at the first end of the swing lever. The connecting shift connects the swing lever and the second barrel. The swing lever is rotated around the connecting shift. The image capturing device is disposed on an optical path of the lens module for sensing a light beam radiated onto the lens module.

According to another embodiment the present invention, a lens module is provided. The lens module comprises a first circuit wall, a second circuit wall, a swing lever, a lens and a connecting shift. The first barrel has a bump. The second barrel is disposed inside the first barrel. The swing lever has a first end and a second end. The lens is disposed at the first end of the swing lever. The connecting shift connects the swing lever and the second barrel. The swing lever is rotated around the connecting shift.

According to another embodiment the present invention, an electronic device is provided. The electronic device comprises a lens modular. The lens module comprises a first circuit wall, a second circuit wall, a swing lever, a lens and a connecting shift. The first barrel has a bump. The second barrel is disposed inside the first barrel. The swing lever has a first end and a second end. The lens is disposed at the first end of the swing lever. The connecting shift connects the swing lever and the second barrel. The swing lever is rotated around the connecting shift.

The above and other aspects of the invention will become better understood with regard to the following detailed description of the preferred but non-limiting embodiment(s). The following description is made with reference to the accompanying drawings.

DETAILED DESCRIPTION OF THE INVENTION

Various embodiments are disclosed below for elaborating the invention. The cooperation of the bump and the swing lever makes the lens able to swing to the edge of the lens module. Accordingly, the total thickness of the lens module can be reduced. However, the embodiments are for detailed descriptions only, not for limiting the scope of protection of the invention. Furthermore, secondary elements are omitted in the accompanying diagrams of the embodiments for highlighting the technical features of the invention.

Figure 1:
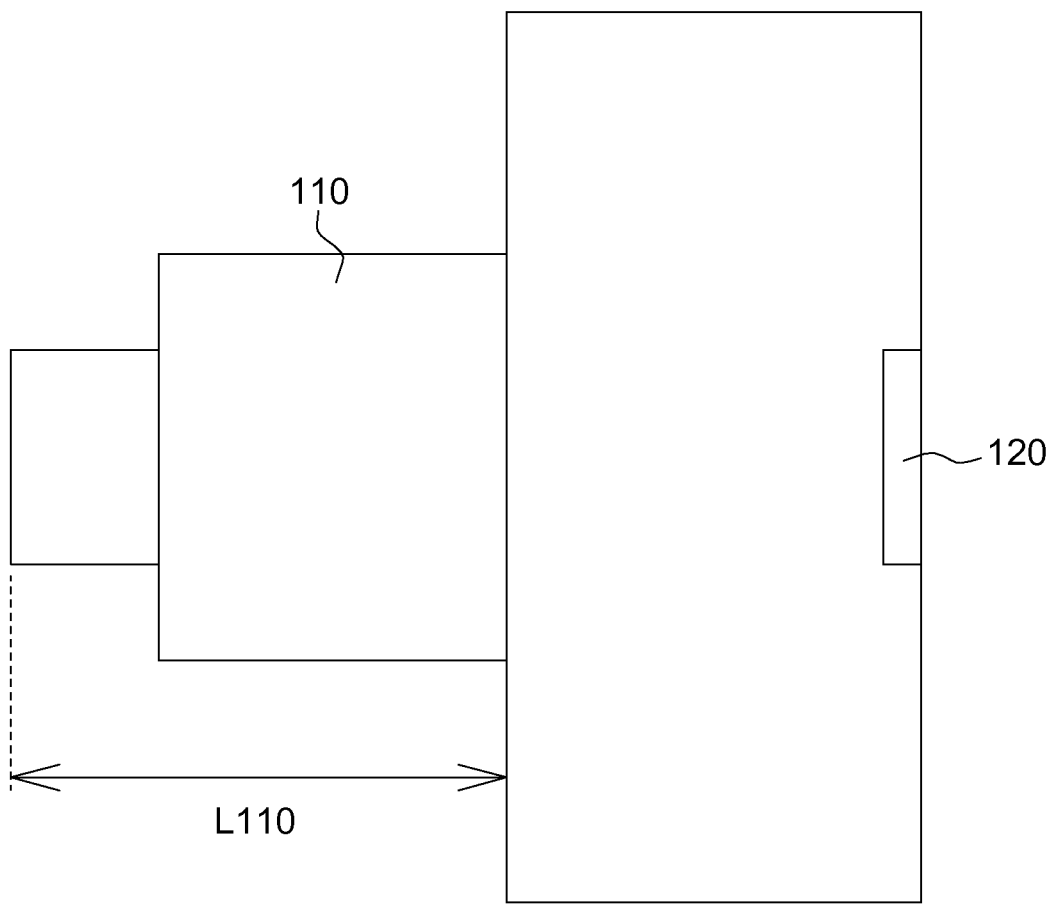
FIG. 1 shows an image capturing system.

Referring to FIG. 1, an image capturing system 100 used in an electronic device is shown. The electronic devices is such as a video recorder, a camera, a mobile phone equipped with video recorder and camera, a notebook computer, a tablet PC, or an event data recorder. The image capturing system 100 includes a lens module 110 and an image capturing device 120. The lens module 110 is used for receiving an external light beam and further focusing the light beam on the image capturing device 120. The image capturing device 120 is disposed on an optical path of the lens module 110 for capturing an image such as a complementary metal-oxide-semiconductor (CMOS) chip, a charge-coupled device (CCD) chip or a negative film.

Figure 2:
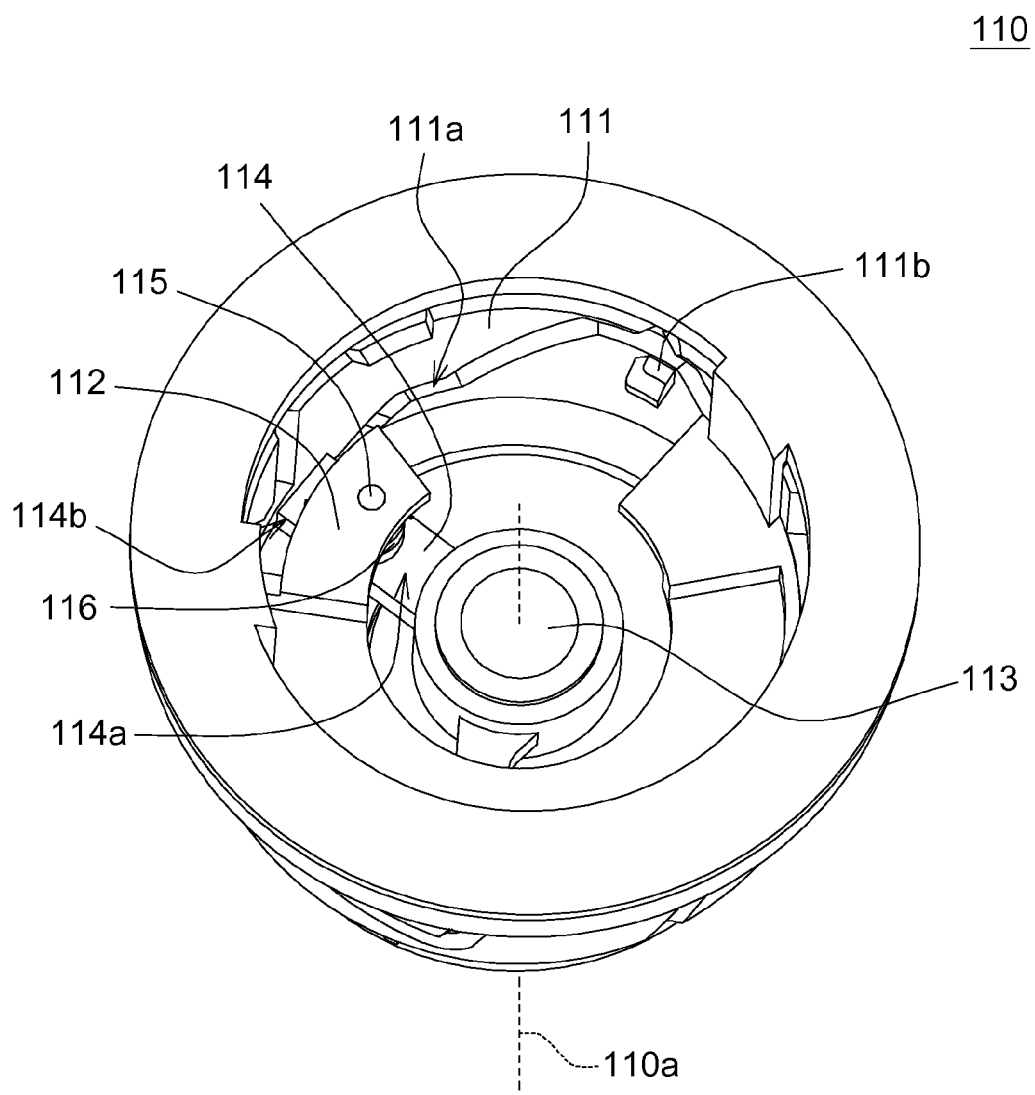
FIG. 2 shows the lens module of FIG. 1.

Referring to FIG. 2, the lens module 110 of FIG. 1 is shown. The lens module 110 includes a first barrel 111, a second barrel 112, a lens 113, a swing lever 114 and a connecting shift 115. The first barrel 111 and the second barrel 112 are hollowed barrel structures with thick walls formed by such as plastics or metal. The first barrel 111 is mounted on the second barrel 112. The first barrel 111 and the second barrel 112 have the same axis 110a. The first barrel 111 and the second barrel 112 can relatively moved on the same axis 110a for changing the length L110 (illustrated in FIG. 1) of the lens module 110.

For example, when the first barrel 111 and the second barrel 112 are relatively close to each other, the length L110 of the lens module 110 will be reduced. When the first barrel 111 and the second barrel 112 are relatively moved away from each other, the length L110 of the lens module 110 will be increased. The number of barrels is not limited to two. In other embodiments, the number of barrels may be three, four, five or even more than five.

The second barrel 112 is connected to the lens 113, and the first barrel 111 is connected to a shutter or another lens. Through the relative rotation and movement between the first barrel 111 and the second barrel 112, the relationship between the lens 113 and shutter or other lens may be changed.

As indicated in FIG. 2, the side wall of the first barrel 111 has a guide rail 111a. The second barrel 112 is rotated along the guide rail 111a with respect to the first barrel 111, so that the second barrel 112 is moved forward or backward with respect to the first barrel 111. In another embodiment, the first barrel 111 is rotated with respect to the second barrel 112, so that the first barrel 111 is moved forward or backward with respect to the second barrel 112.

The lens 113 is a group consists of one or more than one concave lens or convex lens. The lens 113 is coupled to the second barrel 112, and when the second barrel 112 is moved, the lens 113 is moved together. Through the movement of the second barrel 112, the position of the lens 113 is changed and the light beam focusing effect is changed accordingly.

The lens 113 is coupled to the second barrel 112 through the swing lever 114. The swing lever 114 has a first end 114a and a second end 114b. The lens 113 is disposed at the first end 114a. The connecting shift 115 connects the swing lever 114 and the second barrel 112. When the swing lever 114 is rotated around the connecting shift 115, the lens 113 swings with the swing lever 114.

In addition, the first barrel 111 has a bump 111b disposed in the inner side wall of the first barrel 111. When the first barrel 111 is rotated with respect to the second barrel 112, the first barrel 111 drives the bump 111b to move as well.

Figure 3:
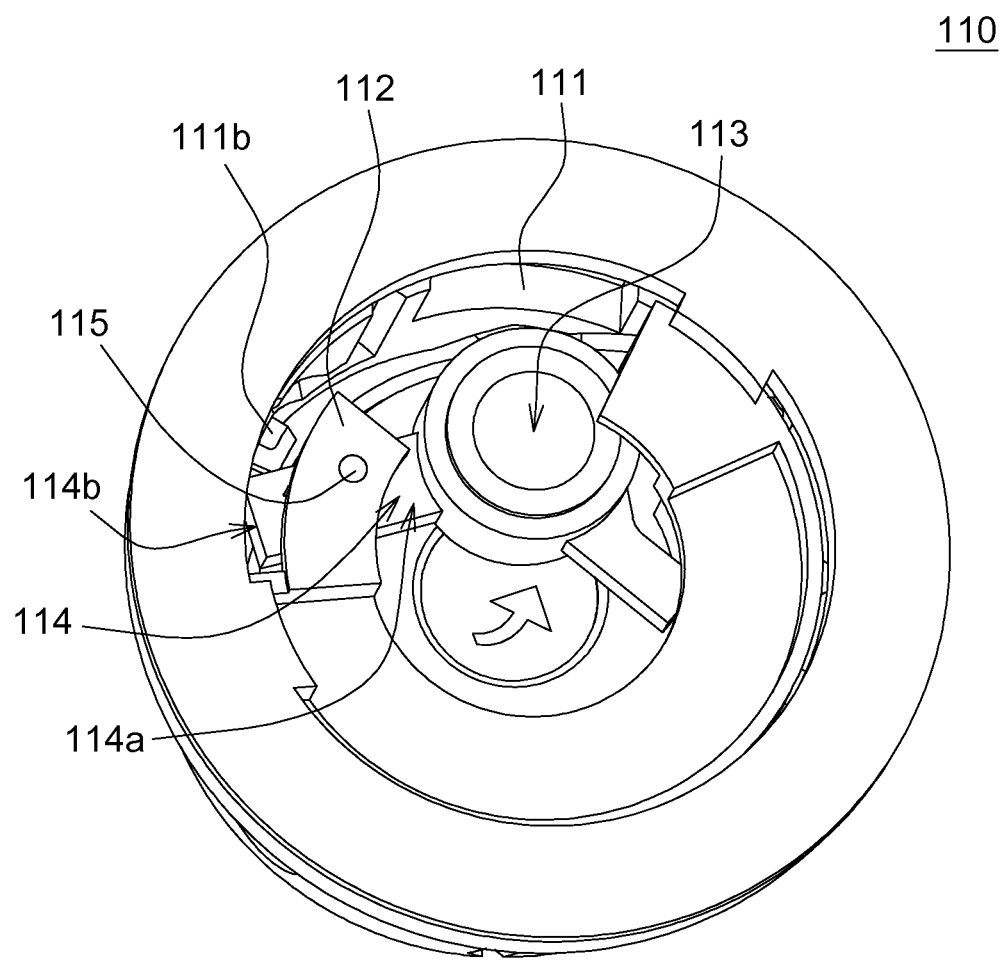
FIG. 3 shows a rotation process of the lens module of FIG. 2.

Referring to FIG. 3, a rotation process of the lens module 110 of FIG. 2 is shown. When the first barrel 111 and the bump 111b move, the bump 111b is moved towards the second end 114b of the swing lever 114 for pushing the swing lever 114 to rotate around the connecting shift 115.

Figure 4:
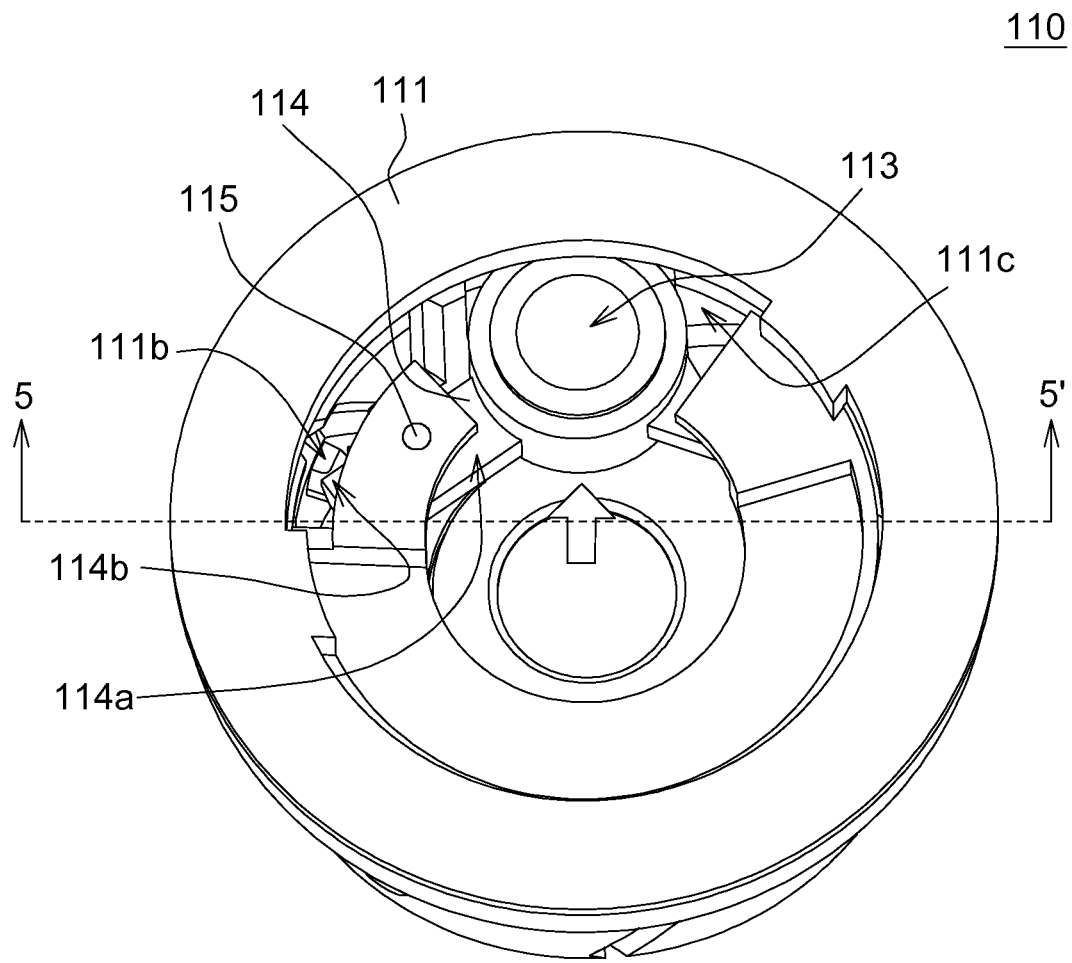
FIG. 4 shows a process of continual rotation of the lens module of FIG. 3.

Referring to FIG. 4, a process of continual rotation of the lens module 110 of FIG. 3 is shown. The swing lever 114, after being rotated, swings the lens 113 to the edge of the first barrel 111 of the lens module 110. In an embodiment, the side wall of the first barrel 111 has an opening 111c used for accommodating the lens 113 swung to the edge.

Figure 5:
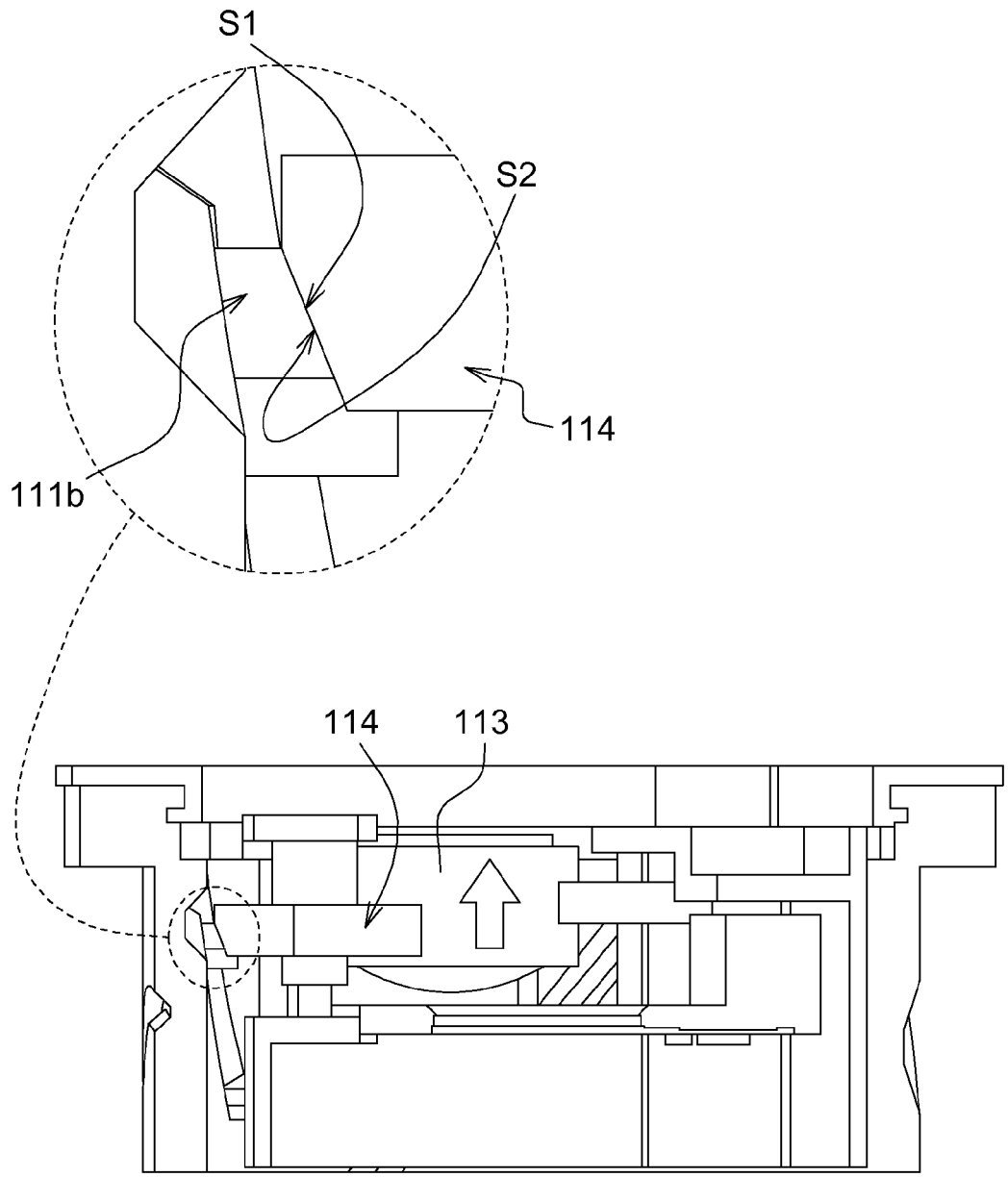
FIG. 5 shows a cross-sectional view along a cross-sectional line 5-5' of the lens module of FIG. 4.

Referring to FIG. 1 and FIG. 5. FIG. 5 shows a cross-sectional view along a cross-sectional line 5-5' of the lens module 110 of FIG. 4. The bump 111b has a first inclined plane S1, and the second end 114b of the swing lever 114 has a second inclined plane S2. When the bump 111b pushes the swing lever 114, the first inclined plane S1 of the bump 111b presses the second inclined plane S2 of the swing lever 114 for lifting the swing lever 114.

In another embodiment, the bump 111b has a first inclined plane S1, but the swing lever 114 does not have a second inclined plane S2. In another embodiment, the swing lever 114 has a second inclined plane S2, but the bump 111b does not have a first inclined plane S1. After the swing lever 114 is lifted, the lens 113 is also lifted, so that the total thickness of the lens module 110 can be reduced.

As indicated in FIG. 4, the first inclined plane S1 and the second inclined plane S2 are correspondingly engaged with each other, so that the process in which the first inclined plane S1 pushes the second inclined plane S2 is made smoother. The first inclined plane S1 and the second inclined plane S2 are correspondingly engaged with each other, so that when the first inclined plane S1 contacts the second inclined plane S2, the first inclined plane S1 and the second inclined plane S2 are appressed. For example, the first inclined plane S1 and the second inclined plane S2 can both be a planar surface; or, one is a concave surface and the other is a convex surface; or, the two planes are corresponding wavy surfaces.

Through the above design, when the image capturing system 100 is not capturing images, the lens 113 may be received to the edge of the lens module 110 for reducing the thickness of the lens module 110. When the image capturing system 100 is about to capture images, the lens 113 is restored to be on the optical path for focusing the light beam onto the image capturing device 120 (illustrated in FIG. 1).

Referring to FIG. 2. For restoring the lens 113, the lens module 110 further includes an elastic member 116 such as a torsion spring or a helical compression spring, or a spring possessing the functions of both the torsion spring and the helical compression spring. The elastic member 116 is mounted on the connecting shift 115. One end of the elastic member 116 is connected to the second barrel 112, and the other end of the elastic member 116 is connected to the swing lever 114.

Figure 6:
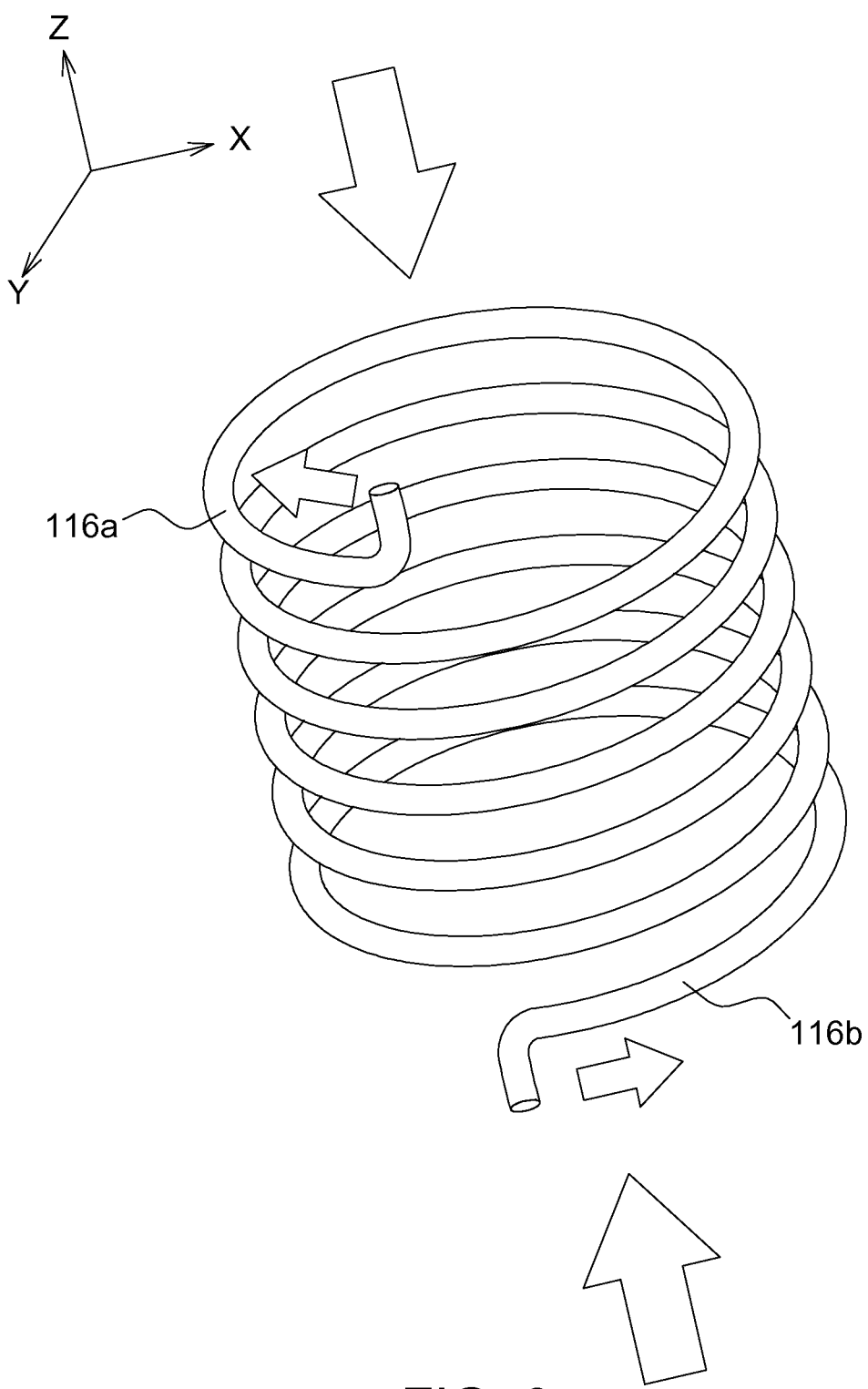
FIG. 6 shows an enlargement diagram of an elastic member of FIG. 2.

Referring to FIG. 6, an enlargement diagram of the elastic member 116 of FIG. 2 is shown. When the upper end 116a of the elastic member 116 is twisted clockwise and the lower end 116b of the elastic member 116 is twisted anti-clockwise, a torsion restoring force is generated. When the elastic member 116 is released, the torsion restoring force will enable the elements connected to the upper end 116a and the lower end 116b of the elastic member 116 to be twisted to their original positions.

Referring to FIG. 6. When the upper end 116a and the lower end 116b of the elastic member 116 are compressed, a compression restoring force is generated. When the elastic member 116 is released, the compression restoring force will push the elements connected to the upper end 116a and the lower end 116b of the elastic member 116 to their original positions.

When the bump 111b pushes the swing lever 114 (meanwhile, the lens 113 swings to the edge of the lens module 110), the elastic member 116 generates a torsion restoring force and a compression restoring force. With the torsion restoring force and the compression restoring force, when the bump 111b leaves the swing lever 114, the elasticity restoring force and the compression restoring force bring the swing lever 114 to a fixed position, so that the lens 113 restores to be on the optical path.

Through the above design, when the image capturing system 100 is not capturing images, the lens 113 is received at the edge of the first barrel 111 of the lens module 110 for reducing the thickness of the lens module 110. When the image capturing system 100 is about to capture images, the lens 113 is quickly restored to be on the optical path for focusing the light beam onto the image capturing device 120.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens module, comprising:
a first barrel having a bump;
a second barrel disposed inside the first barrel;
a lens;
a swing lever having a first end and a second end, the lens being disposed at the first end; and
a connecting shift connecting the swing lever and the second barrel, the swing lever being rotatable around the connecting shift, and the lens being relatively moveable to the second barrel;
wherein the bump is used for pushing the second end of the swing lever.

2. The lens module according to claim 1, wherein the bump has a first inclined plane with which the bump presses the second end of the swing lever.

3. The lens module according to claim 2, wherein the second end of the swing lever has a second inclined plane, and the first inclined plane of the bump presses the second inclined plane of the swing lever.

4. The lens module according to claim 3, wherein the first inclined plane and the second inclined plane are correspondingly engaged with each other.

5. The lens module according to claim 1, further comprising an elastic member disposed on the connecting shift.

6. The lens module according to claim 5, wherein the elastic member is a torsion spring or a helical compression spring.

7. The lens module according to claim 1, wherein the first barrel connects a shutter or another lens.

8. The lens module according to claim 1, wherein the first barrel has an opening, and the opening is used for accommodating the lens.

9. An electronic device, comprising the lens module claimed in claim 1.

10. An image capturing system, comprising:
a lens module, comprising:
a first barrel having a bump;
a second barrel disposed inside the first barrel;
a swing lever having a first end and a second end;
a lens disposed at the first end of the swing lever; and
a connecting shift connecting the swing lever and the second barrel, the swing lever being rotatable around the connecting shift, and the lens being relatively moveable to the second barrel; and
an image capturing device disposed on an optical path of the lens module for sensing a light beam radiated onto the lens module.

11. The image capturing system according to claim 10, wherein the bump pushes the second end of the swing lever.

12. The image capturing system according to claim 10, wherein the bump has a first inclined plane, and the first inclined plane of the bump presses the second end of the swing lever.

13. The image capturing system according to claim 12, wherein the second end of the swing lever has a second inclined plane, and the first inclined plane of the bump presses the second inclined plane of the swing lever for lifting the swing lever.

14. The image capturing system according to claim 10, further comprising an elastic member disposed on the connecting shift for providing an elasticity restoring force to the swing lever.

15. The image capturing system according to claim 14, wherein the elastic member is a torsion spring or a helical compression spring.

16. A lens module, comprising:
a first barrel having a bump;
a second barrel disposed inside the first barrel;
a swing lever having a first end and a second end;
a lens disposed at the first end of the swing lever; and
a connecting shift connecting the swing lever and the second barrel, the swing lever being rotatable around the connecting shift, the lens being relatively moveable to the second barrel.

17. The lens module according to claim 16, wherein the bump has a first inclined plane, and the first inclined plane of the bump pushes and press the second end of the swing lever.

18. The lens module according to claim 16, further comprising an elastic member disposed on the connecting shift.

19. The lens module according to claim 16, wherein the first barrel has an opening used for accommodating the lens.

20. An electronic device, comprising the lens module claimed in claim 16.

* * * * *